(12) United States Patent
Cheng et al.

(10) Patent No.: US 8,436,834 B2
(45) Date of Patent: May 7, 2013

(54) OPTICAL TOUCH DEVICE AND LOCATING METHOD THEREOF

(75) Inventors: Hsin-Chi Cheng, Hsinchu (TW); Cho-Yi Lin, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 728 days.

(21) Appl. No.: 12/632,796

(22) Filed: Dec. 8, 2009

(65) Prior Publication Data

US 2011/0061950 A1 Mar. 17, 2011

(30) Foreign Application Priority Data

Sep. 17, 2009 (TW) .............................. 98131423 A

(51) Int. Cl.
*G06F 3/042* (2006.01)

(52) U.S. Cl.
USPC ...................... 345/175; 178/18.09; 178/18.11

(58) Field of Classification Search .................. None
See application file for complete search history.

(56) References Cited

U.S. PATENT DOCUMENTS

| | | | |
|---|---|---|---|
| 4,673,918 A | 6/1987 | Adler et al. | |
| 4,778,989 A | 10/1988 | Hagemayer et al. | |
| 6,278,474 B1 | 8/2001 | Wada et al. | |
| 6,391,023 B1 | 5/2002 | Weber et al. | |
| 6,538,644 B1 * | 3/2003 | Muraoka ....................... 345/175 | |
| 6,974,450 B2 | 12/2005 | Weber et al. | |
| 8,074,501 B2 | 12/2011 | Kummer et al. | |
| 2001/0025190 A1 | 9/2001 | Weber et al. | |
| 2003/0014041 A1 | 1/2003 | Weber et al. | |
| 2003/0120183 A1 | 6/2003 | Simmons | |
| 2004/0149892 A1 * | 8/2004 | Akitt et al. ................ 250/221 |
| 2005/0128190 A1 * | 6/2005 | Ryynanen ................... 345/173 |
| 2005/0239028 A1 | 10/2005 | Wu et al. | |
| 2005/0243070 A1 * | 11/2005 | Ung et al. ................... 345/176 |
| 2006/0034042 A1 | 2/2006 | Hisano et al. | |
| 2007/0025602 A1 | 2/2007 | Nothaft et al. | |
| 2007/0146318 A1 | 6/2007 | Juh et al. | |
| 2009/0167656 A1 * | 7/2009 | Ahn et al. ...................... 345/87 |
| 2009/0200453 A1 * | 8/2009 | Lieberman et al. ........ 250/208.2 |
| 2010/0064785 A1 | 3/2010 | Kummer et al. | |
| 2010/0309169 A1 | 12/2010 | Lieberman et al. | |
| 2011/0018805 A1 | 1/2011 | Liao et al. | |
| 2011/0115904 A1 | 5/2011 | Te-Yuan et al. | |
| 2011/0122076 A1 | 5/2011 | Herman | |
| 2011/0148818 A1 | 6/2011 | Jhu et al. | |
| 2011/0158601 A1 | 6/2011 | Lew | |
| 2011/0181506 A1 | 7/2011 | Lee | |
| 2011/0193790 A1 | 8/2011 | Lin | |
| 2011/0193969 A1 | 8/2011 | Tsai et al. | |
| 2011/0199337 A1 | 8/2011 | Tang et al. | |

(Continued)

*Primary Examiner* — Adam R Giesy

(74) *Attorney, Agent, or Firm* — WPAT, PC; Justin King

(57) ABSTRACT

An optical touch device includes a light guide module including a first light guide component, a second light guide component, a third light guide component and a fourth light guide component, a light source module including a first light emitting component and a second light emitting component for emitting light alternately and an image detecting module disposed between two neighboring ends of the first light guide component and the second light guide component. The third light guide component and the fourth light guide component are mirror light guide components. A field of view of the image detecting module covers the third light guide component and the fourth light guide component. The optical touch device can avoid a blind zone and can be used as a dual-touch device or a multi-touch device. A locating method and a linear source module are also provided.

12 Claims, 10 Drawing Sheets

U.S. PATENT DOCUMENTS

2011/0216953 A1 9/2011 Callahan et al.
2012/0013577 A1 1/2012 Lin

2012/0242622 A1 9/2012 Tseng et al.

* cited by examiner

OPTICAL TOUCH DEVICE AND LOCATING METHOD THEREOF

CROSS-REFERENCE TO RELATED APPLICATIONS

This application is based upon and claims the benefit of priority from the prior Taiwanese Patent Application No. 098131423, filed Sep. 17, 2009, the entire contents of which are incorporated herein by reference.

BACKGROUND

1. Field of the Invention

The present invention relates to a touch device, and particularly to an optical touch device and a locating method thereof, and a linear light source module.

2. Description of the Related Art

Nowadays, a touch function has been one of necessary functions of many electronic devices. A touch device is an important component to achieve the touch function. Generally, a familiar type of the touch device is, for example, a resistive touch device, a capacitive touch device or an optical touch device. The electronic devices can be equipped with various touch devices in accordance with the various demands.

FIG. 1 is a schematic view of a conventional optical touch device. Referring to FIG. 1, the conventional optical touch device 100 includes a light guide module 110, a light emitting component 120 and an image detecting module 130. The light guide module 110 includes two light guide bars 112a and 112b and a mirror bar 114. The light guide bars 112a and 112b and the mirror bar 114 are arranged along three sides of a rectangle. The light guide bar 112a faces to the mirror bar 114 and the light guide bar 112b is connected between the light guide bar 112a and mirror bar 114. The area in the rectangle defines a detecting area 116. In addition, the light emitting component 120 is disposed between two neighboring ends of the light guide bar 112a and the light guide bar 112b and is configured for emitting light into the light guide bar 112a and the light guide bar 112b. The light guide bar 112a and the light guide bar 112b are configured for converting the light from the light emitting component 120 into a linear light to irradiate the detecting area 116. The image detecting module 130 is disposed besides the light guide bar 112a. A field of view (FOV) of the image detecting module 130 covers the detecting area 116.

The image detecting module 130 is configured for detecting a touch point (i.e., a light blocking object) in the detecting area 116 and calculating a position of the touch point. In detail, the touch point A in the detecting area 116 has a mirror point A1 formed by the mirror bar 114. Meanwhile, the image detecting module 130 can detect dark points A2 and A3. Thus, distances d1 and d2 can be calculated. Then, according to the distances d1 and d2 and other known parameters, the position (i.e., coordinates) of the touch point A can be calculated. The other known parameters mentioned above include a length of the detecting area 116 along the X axis, a width of the detecting area 116 along the Y axis, a shortest distance between the touch point A and the mirror bar 114 that is equal to a shortest distance between the mirror point A and the mirror bar 114, and so on. A detailed calculating method of the position of the touch point A is familiar to one skilled in the art and is not be described here.

However, the conventional optical touch device 100 has a blind zone 150 as shown in FIG. 1. The blind zone 150 refers to an area in the detecting area 116 where the coordinates of the touch point can not be calculated accurately. For example, the touch point B in the detecting area 116 is just located in the blind zone 150 so that the dark points B2 and B3 detected by the image detecting module 130 are overlapped partially. Thus, the coordinates of the touch point B can not be calculated accurately.

FIG. 2 is a schematic view of another conventional optical touch device. Referring to FIG. 2, the conventional optical touch device 100a is similar to the conventional optical touch device 100 except that the light guide module 110a includes two light guide bars 112a and 112b and two mirror bars 114a and 114b. The light guide bar 112a is adjacent to the light guide bar 112b, and the mirror bar 114a is adjacent to the mirror bar 114b. The light guide bars 112a and 112b and the mirror bars 114a and 114b are arranged along four sides of a rectangle. The area in the rectangle defines a detecting area 116.

Comparative to the conventional optical touch device 100, although the area of the blind zone 150a of the conventional optical touch device 100a has been decreased, the problem of the blind zone as mentioned above still exists. In addition, because the light guide module 110a of the conventional optical touch device 100a includes two mirror bars 114a and 114b, one touch point in the detecting area 116 will generate three mirror points correspondingly. Thus, the image detecting module 130 will detect more dark points than the conventional optical touch device 100, thereby increasing the complexity of calculating the coordinates of the one touch point.

Furthermore, when two touch points are simultaneously in the detecting area 116, six mirror points corresponding to the two touch points will generate. Thus, the complexity of calculating the coordinates of the two touch points will be increased greatly. Therefore, the conventional optical touch device 100a is unsuitable to be used as a dual-touch device or a multi-touch device.

BRIEF SUMMARY

The present invention provides an optical touch device to avoid a problem of a blind zone.

The present invention also provides a locating method of an optical touch device so as to solve a problem of a blind zone effectively.

The present invention further provides a linear light source module that is capable of supplying a linear light and has a mirror function.

To achieve the above-mentioned advantages, the present invention provides an optical touch device including a light guide module, a light source module and an image detecting module. The light guide module includes a first light guide component, a second light guide component, a third light guide component and a fourth light guide component arranged along four sides of a rectangle. The first light guide component, the second light guide component, the third light guide component and the fourth light guide component defines a detecting area therebetween. The first light guide component faces to the third light guide component, and the second light guide component faces to the fourth light guide component. Each of the first light guide component and the second light guide component has a first surface facing to the detecting area. Each of the third light guide component and the fourth light guide component is a mirror light guide component. The mirror light guide component includes a light emitting end facing to the detecting area, a second surface opposite to the light emitting end, and a light incident end between the light emitting end and the second surface. The second surface has a mirror light reflecting layer formed thereon. The light source module includes a first light emitting component and a second light emitting component. The first light emitting component is configured for providing light to the light incident end of the third light guide component. The second light emitting component is configured for providing light to the light incident end of the fourth light guide component. The first light emitting component and the second light emitting component are configured for emitting light alternately. The first surfaces of the first light guide component and the second light guide component are configured for guiding the light to the detecting area. The image detecting module is disposed between two neighboring ends of the first light guide component and the second light guide component. A field of view of the image detecting module covers the detecting area, the third light guide component and the fourth light guide component.

In one embodiment provided by the present invention, each of the first light guide component and the second light guide component is a light guide bar. The light guide bar further has a reflecting surface opposite to the first surface and a light incidence surface connected between the first surface and the reflecting surface. The first surface is a light emitting surface. The light source module is further configured for providing light to the light incident surfaces of the first light guide component and the second light guide component.

In one embodiment provided by the present invention, the first light emitting component is disposed between two neighboring ends of the second light guide component and the third light guide component. The first light emitting component is further configured for providing light to the light incidence surface of the second light guide component. The second light emitting component is disposed between two neighboring ends of the fourth light guide component and the first light guide component. The second light emitting component is further configured for providing light to the light incidence surface of the first light guide component.

In one embodiment provided by the present invention, each of the first light guide component and the second light guide component is a light reflecting bar. The first surface of the light reflecting bar is a light reflecting surface. The light source module further includes a third light emitting component disposed between two neighboring ends of the first light guide component and the second light guide component. The third light emitting component is configured for providing light to the detecting area. The light reflecting bar is configured for reflecting the light arriving at the first surface to the detecting area.

In one embodiment provided by the present invention, the third light emitting component is a light emitting diode.

In one embodiment provided by the present invention, the mirror light guide component is either a solid pillar or a hollow pillar.

In one embodiment provided by the present invention, the mirror light guide component is a semi-cylindrical pillar. The light emitting end of the mirror light guide component is a curve surface adjacent to the second surface.

In one embodiment provided by the present invention, the mirror light guide component is hollow. Each of the light incidence end and the light emitting end of the mirror light guide component is either an opening or a transparent layer.

In one embodiment provided by the present invention, the second surface of the mirror light guide component is either a curve surface or a flat surface.

In one embodiment provided by the present invention, the optical touch device further includes a substrate. The light guide module and the light source module are disposed on the substrate.

In one embodiment provided by the present invention, the first light emitting component and the second light emitting component are a light emitting diode respectively.

To achieve the above-mentioned advantages, the present invention also provides a locating method of an optical touch device for aforesaid the optical touch device. Firstly, the first light emitting component and the second light emitting component is controlled to emit light alternately. When the first light emitting component is lighted and the second light emitting component is closed, the image detecting module detects a first optical information. When the first light emitting component is closed and the second light emitting component is lighted, the image detecting module detects a second optical information. Then, the position of the touch point in the detecting area is determined according to the first optical information and the second optical information detected by the image detecting module.

To achieve the above-mentioned advantages, the present invention further provides a linear light source module including a mirror light guide component and a light emitting component. The mirror light guide component has a light emitting end, a surface opposite to the light emitting end and a light incidence end connected between the light emitting end and the surface. The surface has a mirror light reflecting layer formed thereon. The light emitting component is configured for providing light to the light incidence end of the mirror light guide component. When the light emitting component is lighted, the mirror light guide component is configured for converting the light from the light emitting component into a linear light to emit from the light emitting end. When the light emitting component is closed, the mirror light guide component is configured for providing a mirror function.

In the optical touch device of the present invention, the third light guide component and the fourth light guide component of the light guide module are the mirror light guide components, and the first light emitting component and the second light emitting component are configured for emitting light alternately. When the third light guide component provides a mirror function, the fourth light guide provides a light guide function. When the fourth light guide provides a mirror function, the third light guide component provides a light guide function. Thus, the image detecting module can detect effective and available optical information, and thereby avoiding the problem of the blind zone. In addition, the locating method of the optical touch device of the present invention includes the step of controlling the first light emitting component and the second light emitting component to emit light alternately. Thus, the image detecting module can detect the effective and available optical information including the first optical information and the second optical information. The position of the touch point in the detecting area can be calculated in accordance with the first optical information and the second optical information, and thereby solving the problem of the blind zone. Further, the linear light source module of the present invention has two functions. The linear light source module can be used to provide a linear light on the condition that the light emitting component is lighted. Also, because the mirror light reflecting layer is formed on the surface of the mirror light guide component, the linear light source module can has a mirror function on the condition that the light emitting component is closed.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
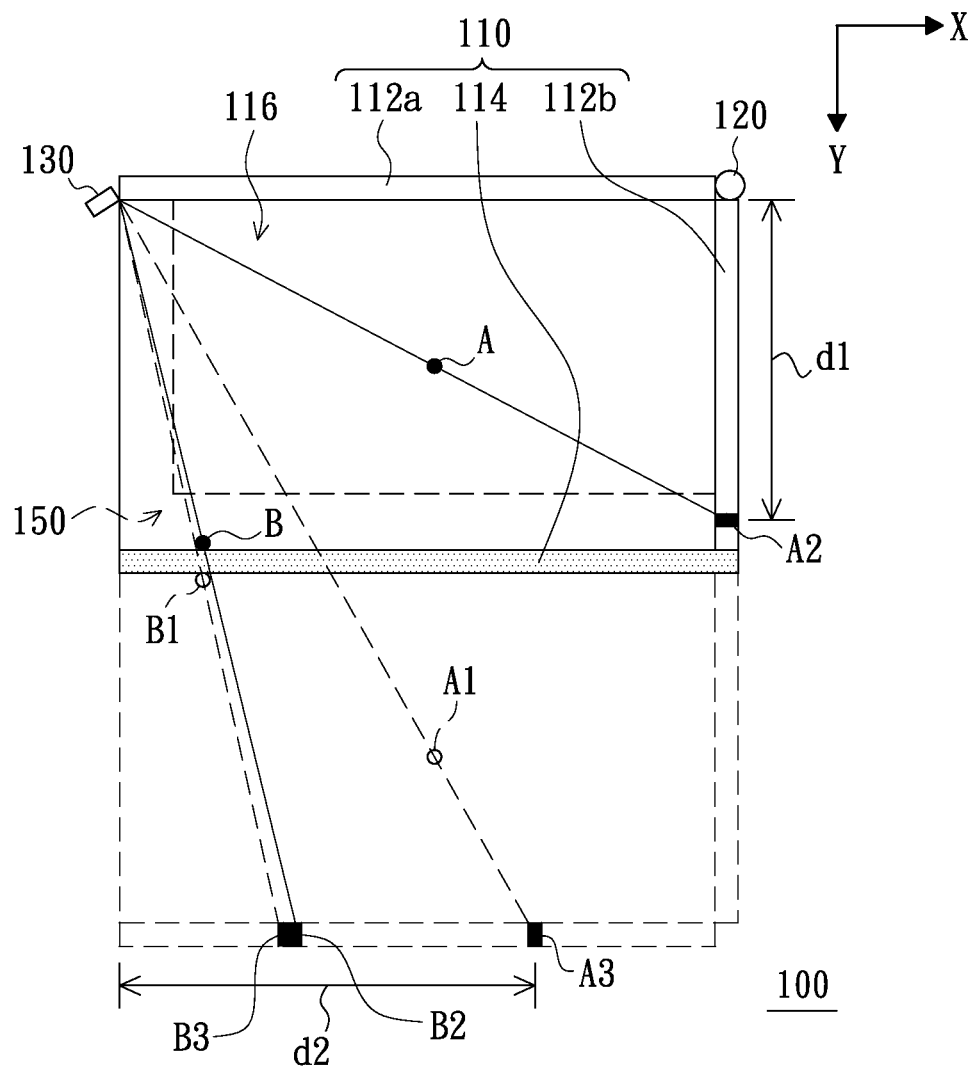
FIG. 1 is a schematic view of a conventional optical touch device.
Figure 2:
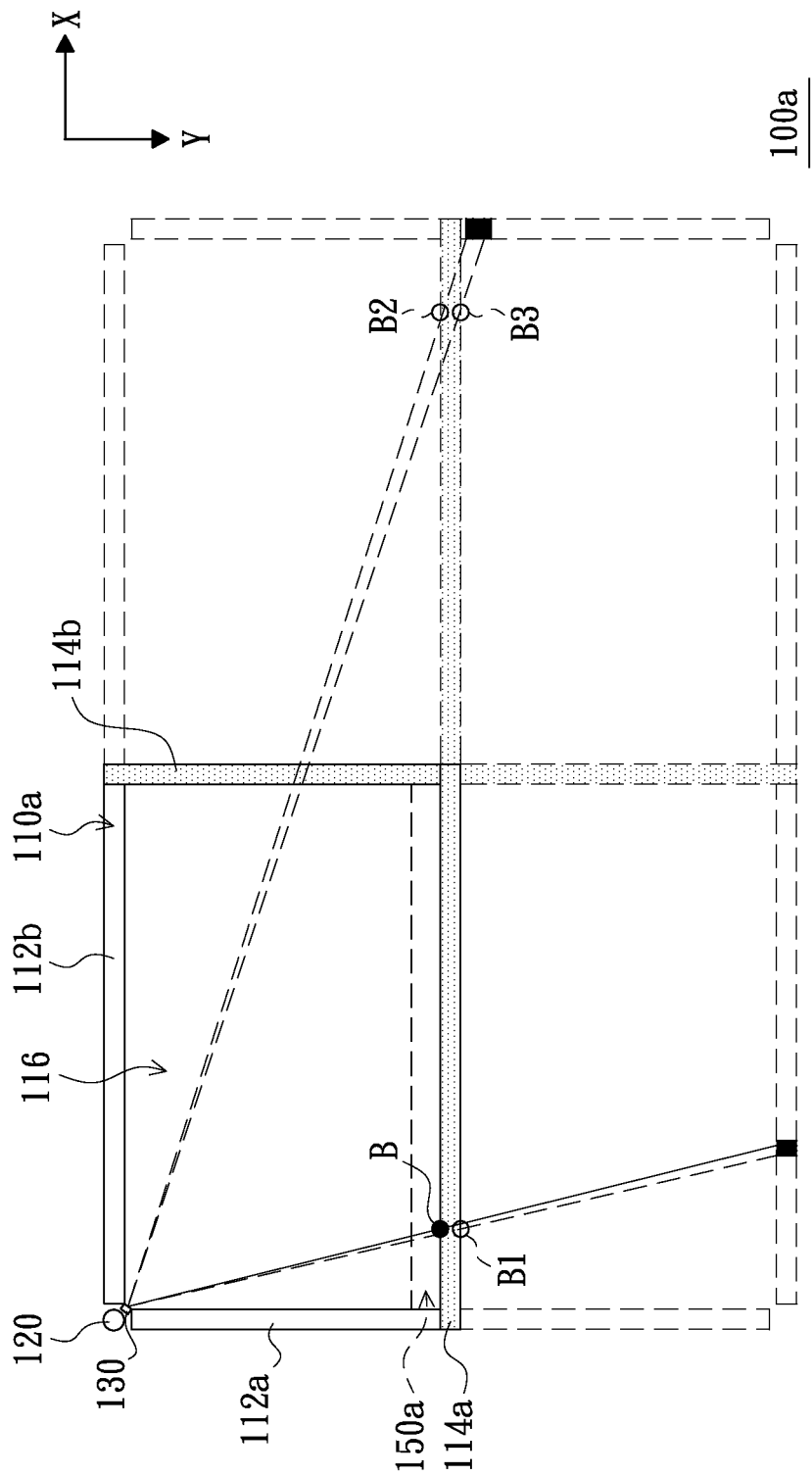
FIG. 2 is a schematic view of another conventional optical touch device.
Figure 3:
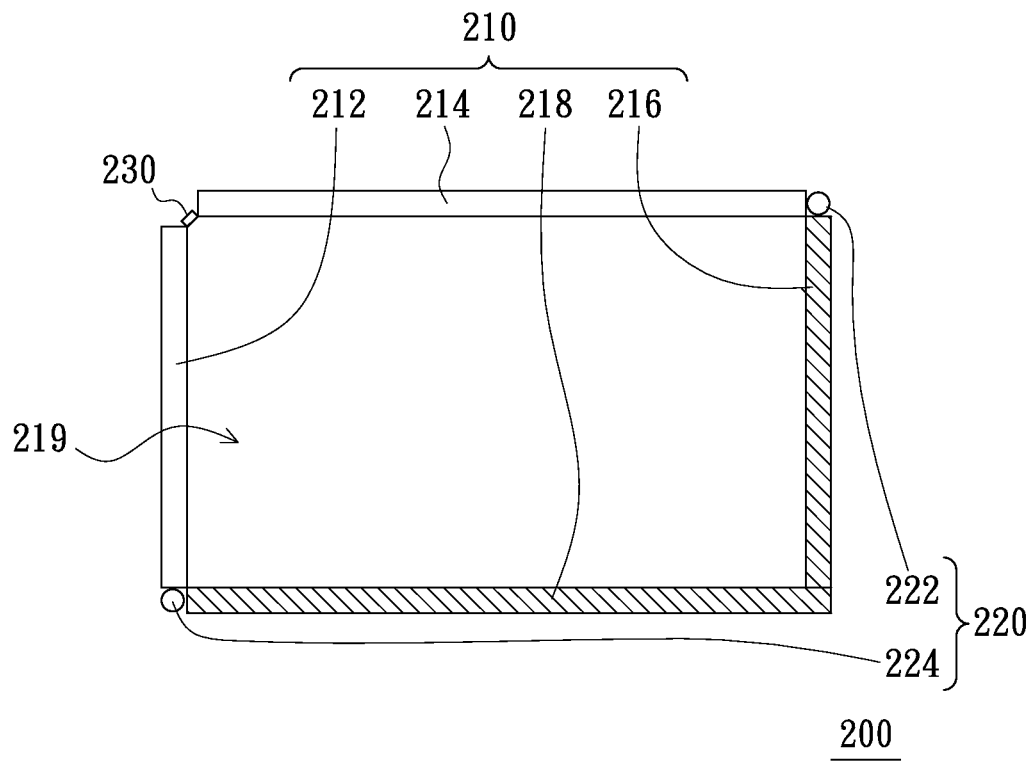
FIG. 3 is a schematic view of an optical touch device in accordance with a first embodiment of the present invention.

FIG. 3 is a schematic view of an optical touch device in accordance with a first embodiment of the present invention. Referring to FIG. 3, in the present embodiment, the optical touch device 200 includes a light guide module 210, a light source module 220 and an image detecting module 230. The light guide module 210 includes a first light guide component 212, a second light guide component 214, a third light guide component 216 and a fourth light guide component 218 arranged along four sides of a rectangle. The first light guide component 212, the second light guide component 214, the third light guide component 216 and the fourth light guide component 218 defines a detecting area 219 therebetween. The first light guide component 212 faces to the third light guide component 216, and the second light guide component 214 faces to the fourth light guide component 218. The light source module 220 is configured for providing light to the third light guide component 216 and the fourth light guide component 218. A field of view of the image detecting module 230 covers the detecting area 219, the third light guide component 216 and the fourth light guide component 218.

Figure 4:
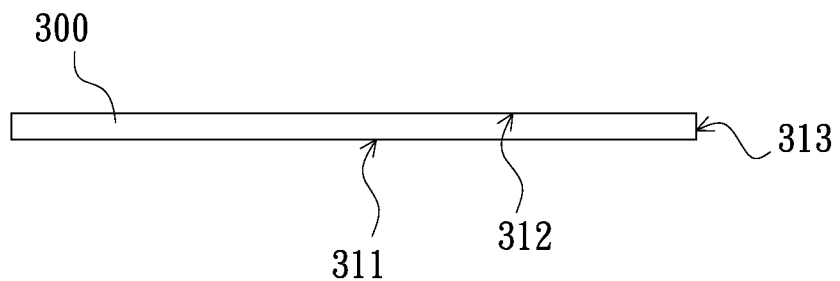
FIG. 4 is a schematic view of a light guide bar in accordance with an embodiment of the present invention.

In the present embodiment, each of the first light guide component 212 and the second light guide component 214 is, for example, a light guide bar 300 as shown in FIG. 4. The light guide bar 300 has a first surface 311, a light reflecting surface 312 opposite to the first surface 311 and a light incidence surface 313 connected between the first surface 311 and the light reflecting surface 312. The first surface 311 serves as a light emitting surface. The light from the light source module 220 enters into the light guide bar 300 through the light incidence surface 313, then is reflected by the light reflecting surface 312, and finally emits from the first surface 311 (i.e., the light emitting surface). Referring FIG. 3 and FIG. 4, in the present embodiment, each of the first light guide component 212 and the second light guide component 214 is a light guide bar 300 as shown in FIG. 4. The first surface 311 of the first light guide component 212 and the first surface 311 of the second light guide component 214 face to the detecting area 219 respectively. The light source module 220 is configured for providing light to the light incidence surface 313 of the first light guide component 212 and the light incidence surface 313 of the second light guide component 214 respectively. The light reflecting surface 312 of the first light guide component 212 and the light reflecting surface 312 of the second light guide component 214 are configured for reflecting the light to the first surface 311 of the first light guide component 212 and the first surface 311 of the second light guide component 214 respectively. Then, the light emits from the first surface 311 of the first light guide component 212 and the first surface 311 of the second light guide component 214 to the detecting area 219 respectively.

Figure 5:
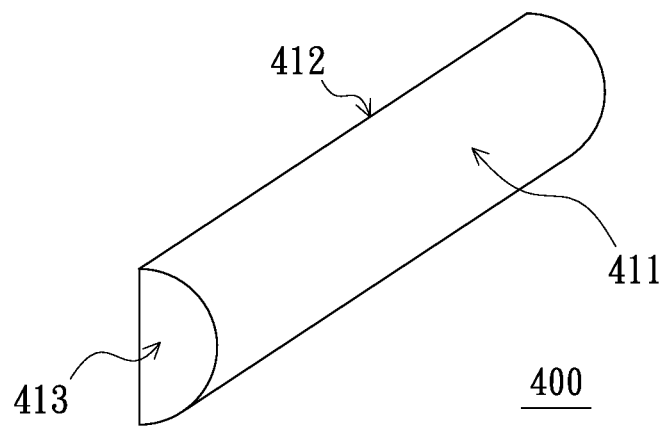
FIG. 5 is a schematic view of a mirror light guide component in accordance with an embodiment of the present invention.

Each of the third light guide component 216 and the fourth light guide component 218 is, for example, a mirror light guide component 400 as shown in FIG. 5. The mirror light guide component 400 includes a light emitting end 411, a second surface 412 opposite to the light emitting end 411, and a light incident end 413 connected between the light emitting end 411 and the second surface 412. The second surface 412 has a mirror light reflecting layer (not shown) formed thereon. When the light enters into the mirror light guide component 400 through the light incidence end 413, the mirror light reflecting layer on the second surface 412 can reflect the light to emit from the light emitting end 411. When no light enters into the mirror light guide component 400 through the light incidence end 413, the mirror light reflecting layer on the second surface 412 can provide a mirror function.

In the present embodiment, the mirror light guide component 400 is, for example, a semi-cylindrical pillar and is solid. The light emitting end 411 of the mirror light guide component 400 is a curve surface adjacent to the second surface 412. The second surface 412 is, for example, a flat surface. It is noted that the mirror light guide component 400 also can be hollow. In addition, the configuration of the mirror light guide component 400 is not limited by the aforesaid configuration. The mirror light guide component 400 can be either a solid pillar or a hollow pillar with suitable cross section configuration, and the second surface 412 can be a curve surface. Referring FIG. 3 and FIG. 5, in the present embodiment, each of the third light guide component 216 and the fourth light guide component 218 is a mirror light guide component 400 as shown in FIG. 5. The light emitting end 411 of the third light guide component 216 and the light emitting end 411 of the fourth light guide component 218 face to the detecting area 219 respectively. The light source module 220 is configured for providing light to the light incidence end 413 of the third light guide component 216 and the light incidence end 413 of the fourth light guide component 218 respectively.

Figure 6:
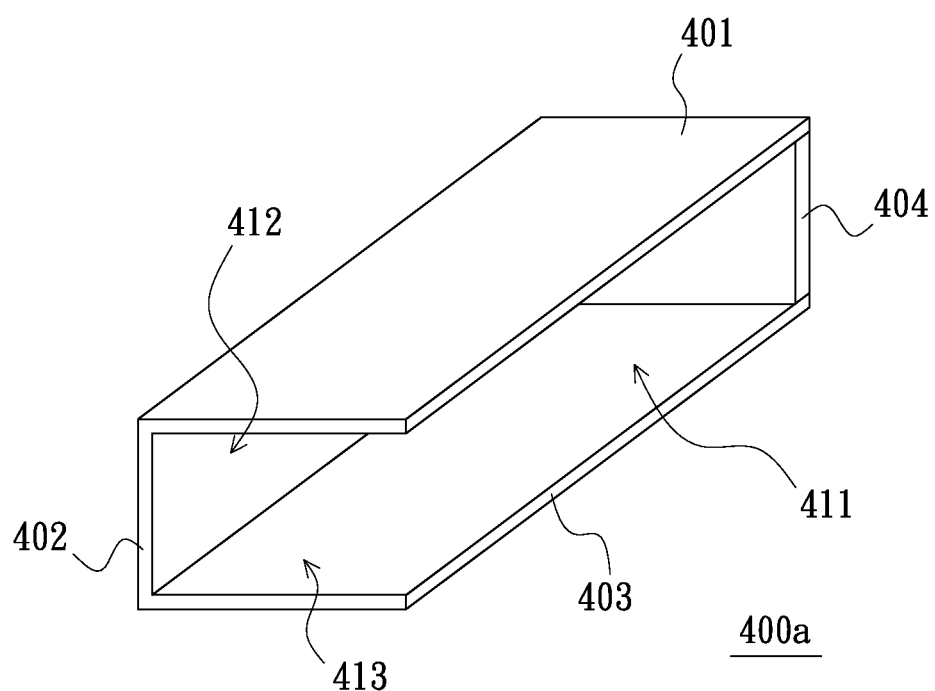
FIG. 6 is a schematic view of a mirror light guide component in accordance with another embodiment of the present invention.

FIG. 6 is a schematic view of a mirror light guide component in accordance with another embodiment of the present invention. Referring to FIG. 6, the mirror light guide component 400a has a similar function to the mirror light guide component 400. The difference of the mirror light guide component 400a and the mirror light guide component 400 is the configuration. In detail, in the present embodiment, the mirror light guide component 400a is hollow. The mirror light guide component 400a includes four plates 401, 402, 403 and 404. The light incidence end 413 and the light emitting end 411 of the mirror light guide component 400a are an opening respectively. The second surface 412 faces to the light emitting end 411, and has a mirror light reflecting layer formed thereon. Referring FIG. 3 and FIG. 6, in the present embodiment, each of the third light guide component 216 and the fourth light guide component 218 is a mirror light guide component 400a as shown in FIG. 6. The light emitting end 411 of the third light guide component 216 and the light emitting end 411 of the fourth light guide component 218 face to the detecting area 219 respectively. The light source module 220 is configured for providing light to the light incidence end 413 of the third light guide component 216 and the light incidence end 413 of the fourth light guide component 218 respectively.

Figure 7:
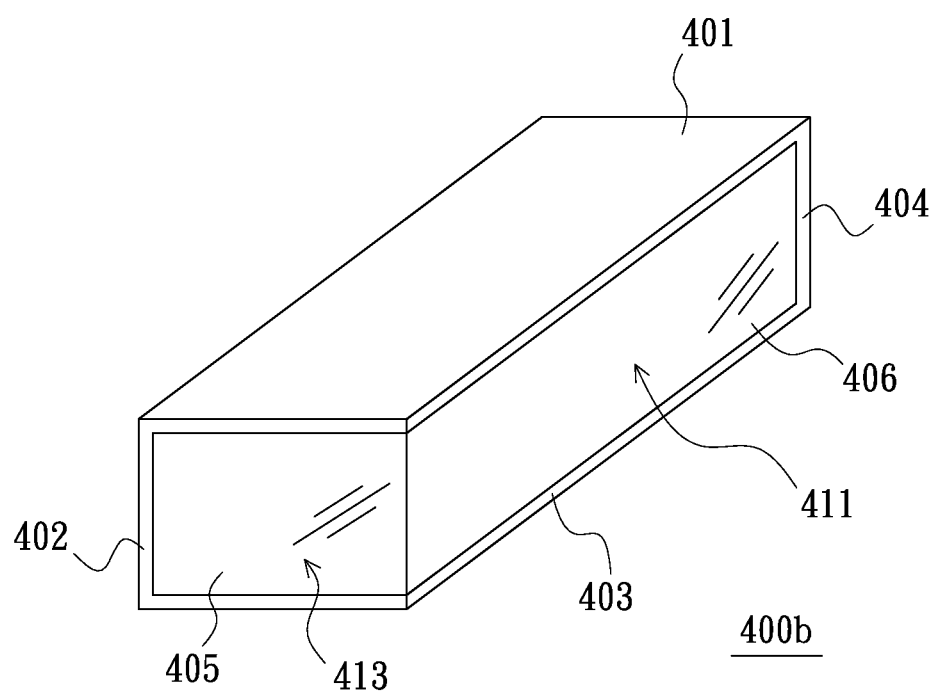
FIG. 7 is a schematic view of a mirror light guide component in accordance with further another embodiment of the present invention.

FIG. 7 is a schematic view of a mirror light guide component in accordance with further another embodiment of the present invention. Referring to FIG. 7, the mirror light guide component 400b is similar to the mirror light guide component 400a except that the light incidence end 413 and the light emitting end 411 are respectively a transparent layer. In detail, in the present embodiment, the mirror light guide component 400b is hollow. The mirror light guide component 400b includes four plates 401, 402, 403 and 404 and two transparent layers 405 and 406. The light incidence end 413 of the mirror light guide component 400b is the transparent layer 405 and the light emitting end 411 of the mirror light guide component 400b is the transparent layer 406. Referring FIG. 3 and FIG. 7, in the present embodiment, each of the third light guide component 216 and the fourth light guide component 218 is a mirror light guide component 400b as shown in FIG. 7. The light emitting end 411 of the third light guide component 216 and the light emitting end 411 of the fourth light guide component 218 face to the detecting area 219 respectively. The light source module 220 is configured for providing light to the light incidence end 413 of the third light guide component 216 and the light incidence end 413 of the fourth light guide component 218 respectively. The light from the light source module 220 can enter into the light incidence end 413 of the third light guide component 216 and the light incidence end 413 of the fourth light guide component 218, and then emit from light emitting end 411 of the third light guide component 216 and the light emitting end 411 of the fourth light guide component 218 to the detecting area 219. The transparent layers 405 and 406 can be made of a transparent material such as a plastic film or a glass.

Again, referring to FIG. 3, the light source module 220 includes, for example, a first light emitting component 222 and a second light emitting component 224. In the present embodiment, the first light emitting component 222 is, for example, disposed between two neighboring ends of the second light guide component 214 and the third light guide component 216. The first light emitting component 222 and the third light guide component 216 form a linear light source module. The first light emitting component 222 is configured for providing light to the light incident end 413 of the third light guide component 216 and providing light to the light incidence surface 313 of the second light guide component 214. The second light emitting component 224 is, for example, disposed between two neighboring ends of the fourth light guide component 218 and the first light guide component 212. The second light emitting component 224 and the fourth light guide component 218 form another linear light source module. The second light emitting component 224 is configured for providing light to the light incident end 413 of the fourth light guide component 218 and providing light to the light incidence surface 313 of the first light guide component 212. In another embodiment, the light can be provided to the first light guide component 212 and the second component 214 by other light emitting components except the first light emitting component 222 and the second light emitting component 224.

The first light emitting component 222 and the second light emitting component 224 are configured for emitting light alternately. When the first light emitting component 222 is lighted and the second light emitting component 224 is closed, the first light emitting component 222 provides the light to the third light guide component 216. The third light guide component 216 then converts the light into a linear light to the detecting area 219. Meanwhile, the fourth light guide component 218 provides a mirror function because the second light emitting component 224 is closed. In contrast, when the first light emitting component 222 is closed and the second light emitting component 224 is lighted, the second light emitting component 224 provides the light to the fourth light guide component 218. The fourth light guide component 218 then converts the light into a linear light to the detecting area 219. Meanwhile, the third light guide component 216 provides a mirror function because the first light emitting component 2222 is closed.

The image detecting module 230 is disposed between two neighboring ends of the first light guide component 212 and the second light guide component 214. A field of view of the image detecting module 230 covers the detecting area 219, the third light guide component 216 and the fourth light guide component 218. Thus, the image detecting module 230 can effectively detect optical information about the touch point in the detecting area 219 and optical information about the mirror point of the touch point formed by the third light guide component 216 or the fourth light guide component 218. According to the optical information, the position of the touch point in the detecting area 219 can be determined accurately.

Additionally, the optical touch device 200 can further includes a substrate (not shown). The light guide module 210 and the light emitting module 220 can be disposed on the substrate.

A locating method of an optical touch device for the optical touch device 200 will be described. The locating method includes the following steps.

Firstly, the first light emitting component 222 and the second light emitting component 224 of the optical touch device 200 is controlled to emit light alternately. When the first light emitting component 222 is lighted and the second light emitting component 224 is closed, the image detecting module 230 detects a first optical information. When the first light emitting component 222 is closed and the second light emitting component 224 is lighted, the image detecting module 230 detects a second optical information.

Secondly, the position of the touch point in the detecting area 219 is determined according to the first optical information and the second optical information detected by the image detecting module 230.

Figure 8:
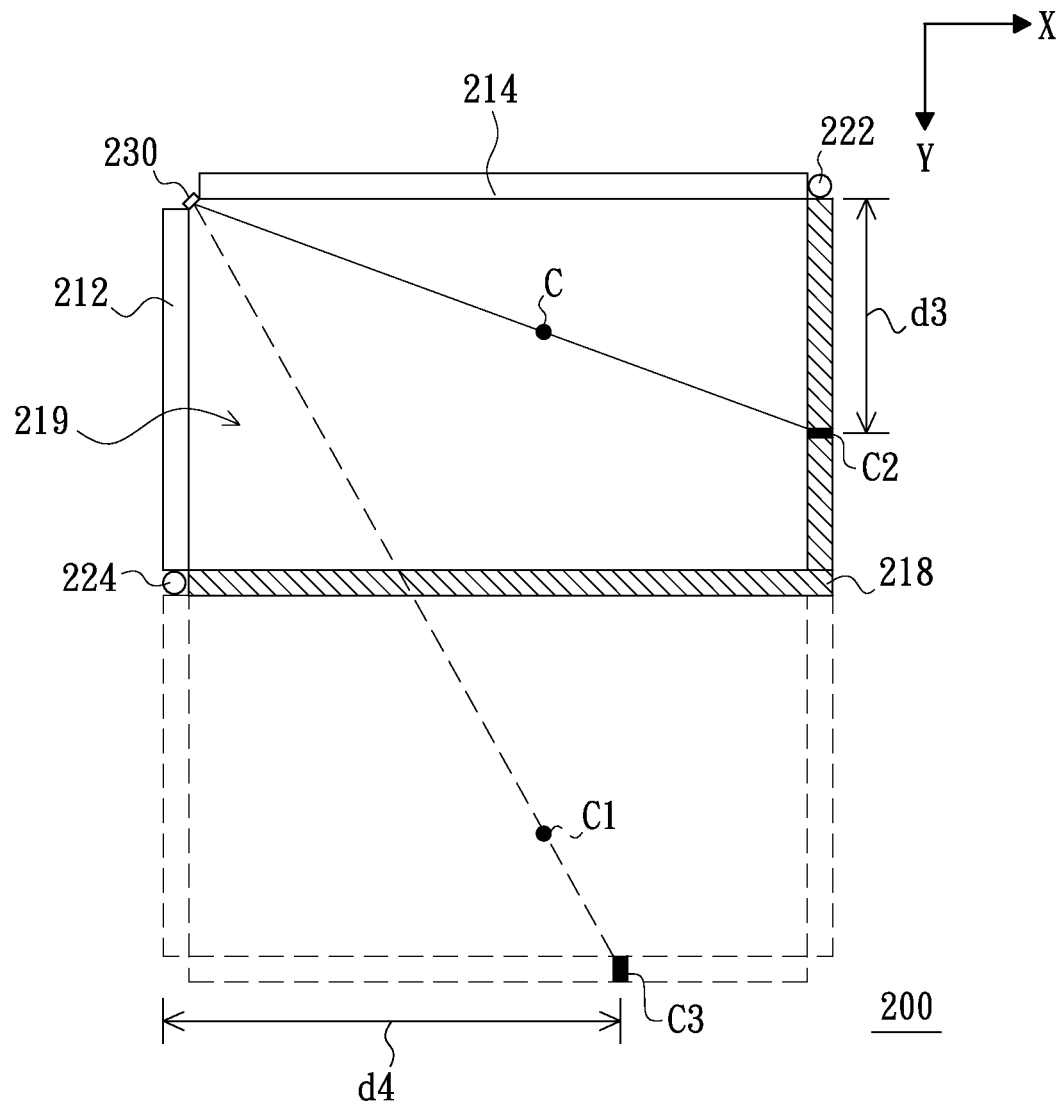
FIG. 8 is a schematic view of a state of the optical device shown in FIG. 2 when the first light emitting component is lighted and the second light emitting component is closed.

In detail, referring to FIG. 8, when the first light emitting component 222 is lighted and the second light emitting component 224 is closed, the fourth light guide component 218 provides a mirror function. Thus, a touch point C in the detecting area 219 can generate a mirror point C1. The image detecting module 230 can detect a first optical information (e.g., the dark points C2 and C3) about the touch point C and the mirror point C1. Thus, distances d3, d4 can be calculated. Then, according to the distances d3, d4 and other known parameters, the position (i.e., the coordinates) of the touch point C can be calculated. The other known parameters mentioned above include a length of the detecting area 219 along the X axis, a width of the detecting area 219 along the Y axis, a shortest distance between the touch point C and the fourth light guide component 218 that is equal to a shortest distance between the mirror point C1 and the fourth light guide component 218, and so on. A detailed calculating method of the position of the touch point C is familiar to one skilled in the art and is not be described here.

In addition, when the first light emitting component 222 is closed and the second light emitting component 224 is lighted, the third light guide component 216 provides a mirror function. Thus, the touch point C in the detecting area 219 can generate a mirror point C4. The image detecting module 230 can detect a second optical information (e.g., the dark points C5 and C6) about the touch point C and the mirror point C4. Thus, distances d5, d6 can be calculated. Then, according to the distances d5, d6 and other known parameters, the position (i.e., the coordinates) of the touch point C can be calculated.

And then, according to the first optical information and the second optical information detected by the image detecting module 230, the position of the touch point C in the detecting area 219 can be determined. Generally, the exact position of the touch point C can be determined by the first optical information and the second optical information respectively.

Figure 9:
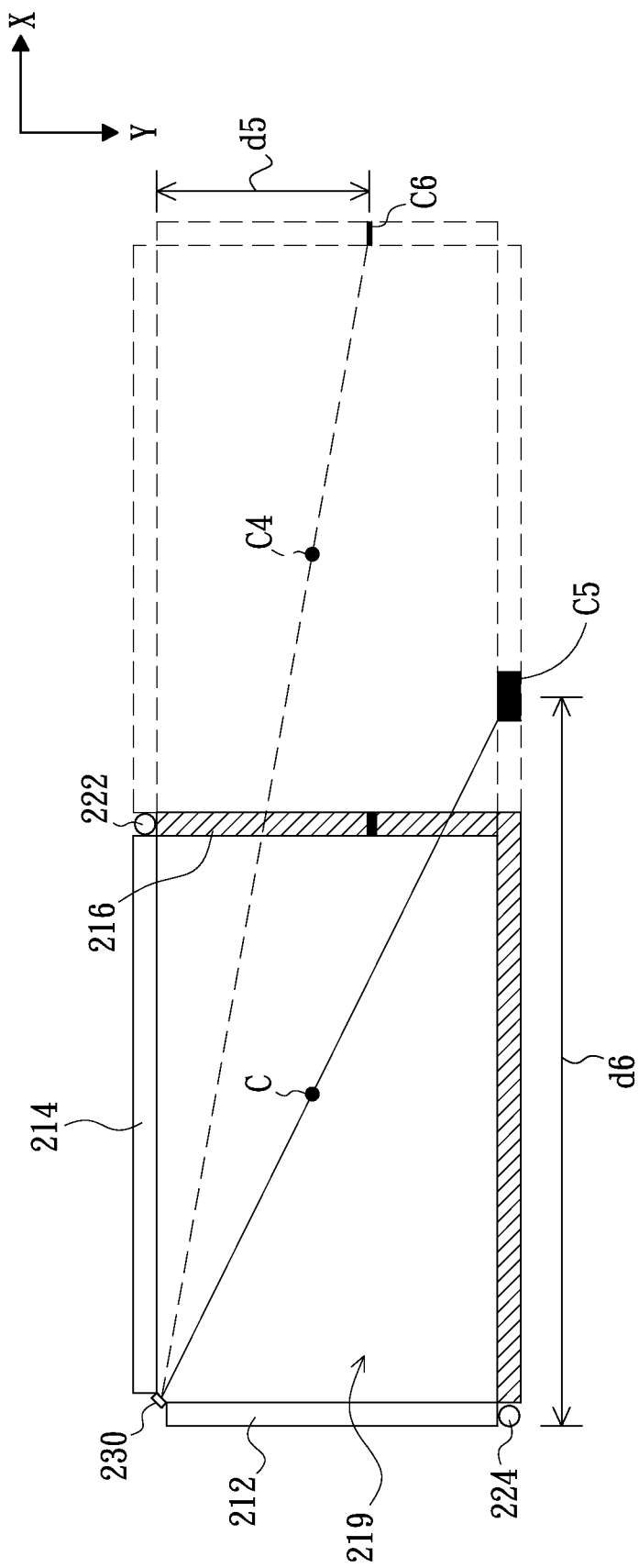
FIG. 9 is a schematic view of a state of the optical device shown in FIG. 2 when the first light emitting component is closed and the second light emitting component is lighted.

However, as mentioned above, when the optical touch device only has one mirror component, the optical touch device will generate a blind zone. In the present embodiment, when the first light emitting component 222 of the optical touch device 200 is lighted and the second light emitting component 224 of the optical touch device 200 is closed, the image detecting module 230 can not detect the effective and available first optical information about the touch point in the blind zone of the detecting area 219. But, when the first light emitting component 222 is closed and the second light emitting component 224 is lighted, the touch point will not be in the blind zone. That is, the image detecting module 230 can detect the effective and available second optical information about the touch point in the detecting area 219. According to the second optical information detected by the image detecting module 230, the position of the touch point in the detecting area 219 can be calculated. And vice versa. In other words, the blind zone of the optical touch device 200 in the state as shown in FIG. 8 is different from the blind zone of the optical touch device 200 in the state as shown in FIG. 9. When one of the first optical information and the second optical information can not be detected, the position of the touch point in the detecting area 219 still can be calculated accurately by the other one of the first optical information and the second optical information that can be detected. Therefore, the optical touch device 200 in the present embodiment and the locating method thereof can avoid the blind zone effectively.

It is noted that the optical touch device 200 in the present embodiment and the locating method thereof can be applied to a field of double touch or a field of multi touch. For example, the optical touch device 200 is used as a dual-touch device in the following description.

Figure 10:
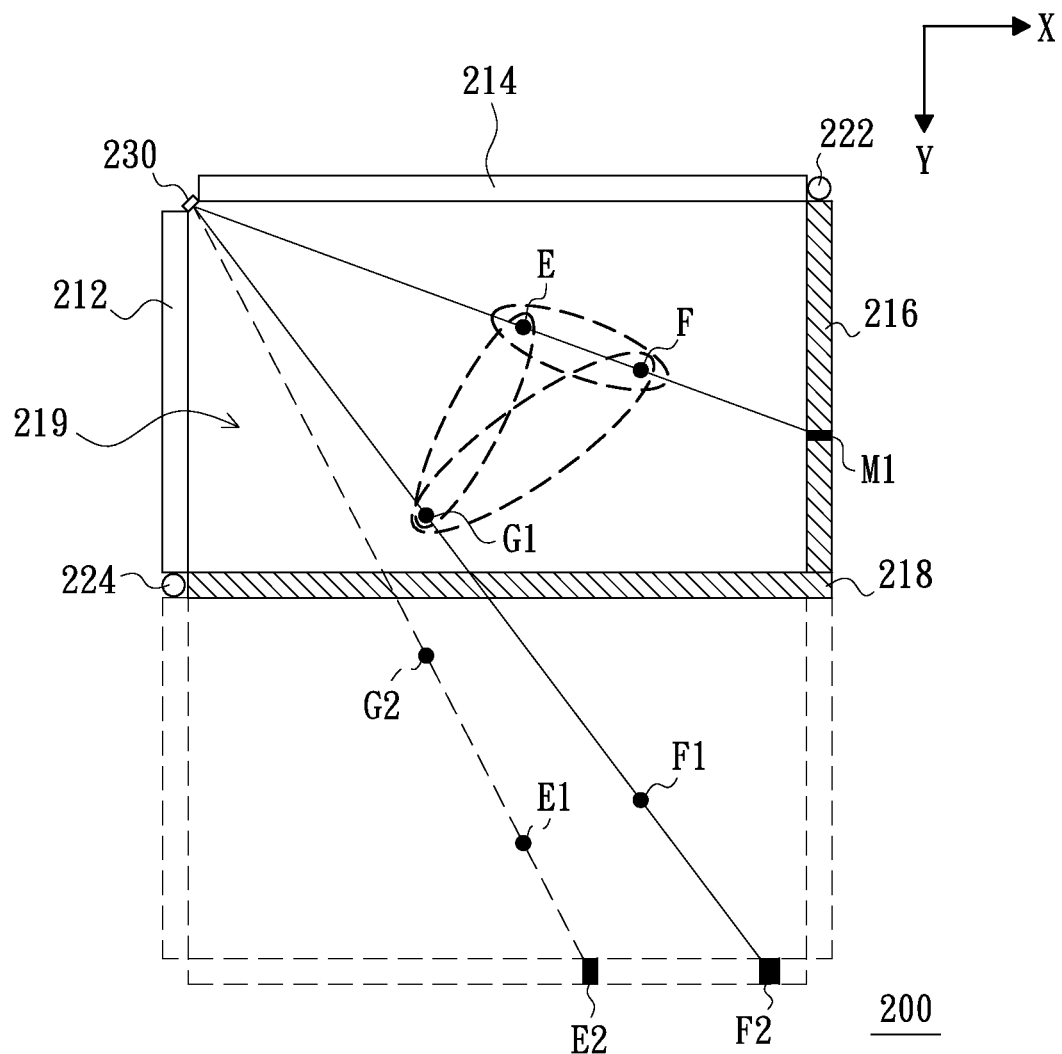
FIG. 10 is a schematic view of a status of the optical device shown in FIG. 2 when two touch points are applied on the optical device and the first light emitting component is lighted and the second light emitting component is closed.
Figure 11:
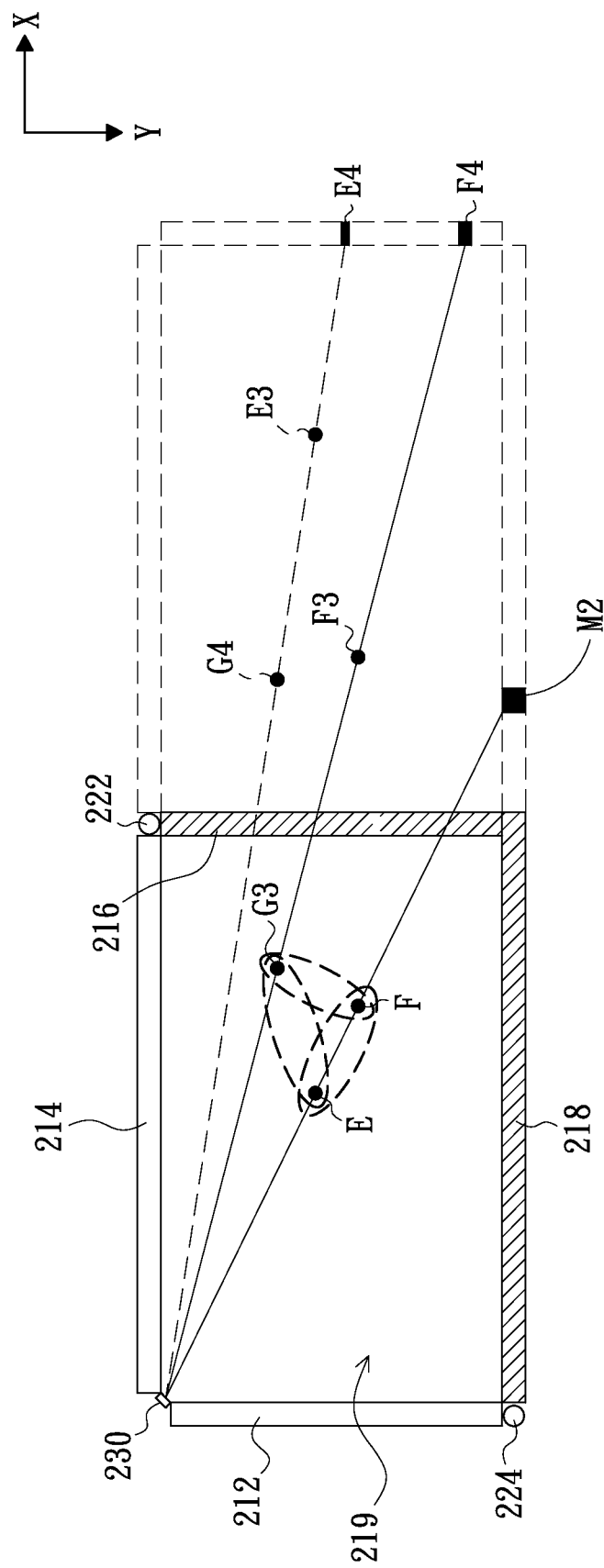
FIG. 11 is a schematic view of a status of the optical device shown in FIG. 2 when two touch points are applied on the optical device and the first light emitting component is closed and the second light emitting component is lighted.

The locating method of the optical touch device 200 used as the dual-touch device is similar to the aforesaid locating method of the optical touch device 200 used as a single-touch device. When two touch points is applied to the optical touch device 200, a ghost image phenomenon may be generated. Herein, the locating method of the optical double touch device 200 used as the dual-touch device is described on the condition that the ghost image phenomenon is generated. FIG. 10 and FIG. 11 are respectively a schematic view of a state of the optical touch device 200 used as the dual-touch device.

Referring to FIG. 10, when the first light emitting component 222 is lighted and the second light emitting component 224 is closed, the fourth light guide component 218 provides a mirror function. Thus, two touch points E, F in the detecting area 219 can generate two corresponding mirror points E1, F1. The image detecting module 230 can detect the first optical information (e.g., the dark points M1, E2, F2) about the touch points E, F and the mirror points E1, F1. Because the dark point M1 is formed by two overlapped dark points, the positions of the touch points E, F and a ghost image point G1 can be calculated according to the first optical information. It is noted that the ghost image point G1 does not exist actually. Thus, the positions of the touch points E, F can not be determined accurately.

Referring to FIG. 11, when the first light emitting component 222 is closed and the second light emitting component 224 is lighted, the third light guide component 216 provides a mirror function. Thus, the two touch points E, F in the detecting area 219 can generate two corresponding mirror points E3, F3. The image detecting module 230 can detect the second optical information (e.g., the dark points M2, E4, F4) about the touch points E, F and the mirror points E3, F3. Because the dark point M2 is formed by two overlapped dark points, the positions of the touch points E, F and a ghost image point G2 can be calculated by the second optical information. It is noted that the ghost image point G2 does not exist actually yet. Because the positions calculated according to the first optical information and the positions calculated according to the second optical information both include the positions of the touch points E, F. Thus, the positions of the touch points E, F can be accurately determined by excluding the positions of the ghost image points G1, G2.

The optical touch device 200 and the locating method thereof utilize a design of the first light emitting component 222 and the second light emitting component 224 emitting light alternately, thereby acquiring the first optical information and the second optical information. According to the first optical information and the second optical information, the position of the touch point can be calculated accurately and simply. Therefore, the optical touch device 200 and the locating method thereof are suitable to be used in the field of dual-touch or multi touch.

Figure 12:
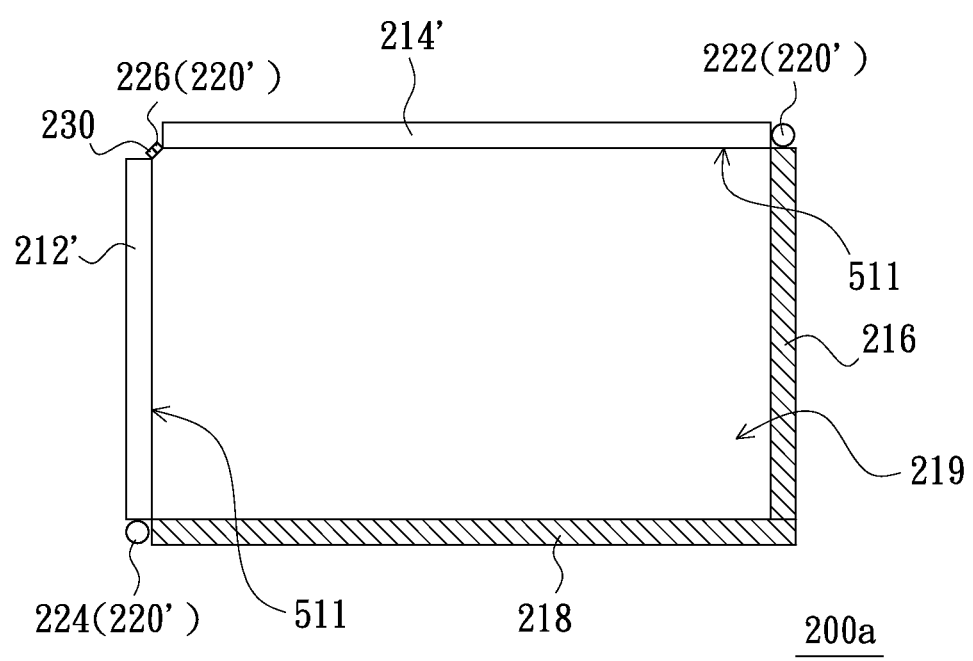
FIG. 12 is a schematic view of an optical touch device in accordance with a second embodiment of the present invention.

FIG. 12 is a schematic view of an optical touch device in accordance with a second embodiment of the present invention. Referring to FIG. 12, the optical touch device 200a is similar to the optical touch device 200 in the first embodiment except that the first light guide component 212' and the second light guide component 214' are respectively a light reflecting bar. The light reflecting bar has a light reflecting surface 511. In the present embodiment, the first surface of the first light guide component 212' and the first surface of the second light guide component 214' respectively serve as the light reflecting surface 511. The light source module 220' further includes a third light emitting component 226 disposed between two neighboring ends of the first light guide component 212' and the second light guide component 214'. The third light emitting component 226 is configured for providing light to the detecting area 219. When the optical touch device 200a works, the third light emitting component 226 will emit light continuously, and the first light guide component 212' and the second light guide component 214' are configured for reflecting the light arriving at the first surfaces thereof (i.e., the light reflecting surfaces 511) to the detecting area 219. In addition, in the present embodiment, the first light emitting component 222 of the optical touch device 200a is, for example, configured for only providing light to the third light guide component 216, and the second light emitting component 224 of the optical touch device 200a is, for example, configured for only providing light to the fourth light guide component 218.

The advantageous of the optical touch device 200a in the present embodiment is similar to the advantageous of the optical touch device 200 in the first embodiment, and is not be described here.

In summary, the present invention has at least the following advantages:

1. The optical touch device has different blind zones when the first light emitting component is lighted and when the second light emitting component is lighted. Thus, when one of the first optical information and the second optical information can not be detected, the position of the touch point still can be calculated by the other one of the first optical information and the second optical information that can be detected. Therefore, the optical touch device and the locating method thereof can solve the problem of the blind zone effectively.

2. The optical touch device can be used as a dual-touch device or a multi-touch device. Because the first optical information and the second optical information detected by the image detecting module include less information (e.g., less dark points), the complexity of calculating the exact positions of the touch points can be reduce. Therefore, the optical touch device and the locating method thereof are suitable to be used in the field of dual-touch or multi-touch.

3. The linear light source module can be used to provide a linear light on the condition that the light emitting component is lighted. Also, because the mirror reflecting layer is formed on the surface of the mirror light guide component, the linear light source module can has a mirror function on the condition that the light emitting component is closed.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An optical touch device, comprising:
a light guide module comprising a first light guide component, a second light guide component, a third light guide component and a fourth light guide component arranged along four sides of a rectangle, the first light guide component, the second light guide component, the third light guide component and the fourth light guide component defining a detecting area therebetween, the first light guide component facing to the third light guide component, the second light guide component facing to the fourth light guide component, each of the first light guide component and the second light guide component having a first surface facing to the detecting area, each of the third light guide component and the fourth light guide component being a mirror light guide component, the mirror light guide component comprising a light emitting end facing to the detecting area, a second surface opposite to the light emitting end, and a light incident end connected between the light emitting end and the second surface, and the second surface having a mirror light reflecting layer formed thereon;

a light source module comprising:
a first light emitting component for providing light to the light incident end of the third light guide component; and
a second light emitting component for providing light to the light incident end of the fourth light guide component, wherein the first light emitting component and the second light emitting component are configured for emitting light alternately, the first surfaces of the first light guide component and the second light guide component are configured for guiding the light to the detecting area; and
an image detecting module disposed between two neighboring ends of the first light guide component and the second light guide component, and a field of view of the image detecting module covering the detecting area, the third light guide component and the fourth light guide component.

2. The optical touch device as claimed in claim 1, wherein each of the first light guide component and the second light guide component is a light guide bar, the light guide bar further having a light reflecting surface opposite to the first surface and a light incidence surface connected between the first surface and the light reflecting surface, the first surface is a light emitting surface, and the light source module is further configured for providing light to the light incident surfaces of the first light guide component and the second light guide component.

3. The optical touch device as claimed in claim 2, wherein the first light emitting component is disposed between two neighboring ends of the second light guide component and the third light guide component, the first light emitting component is further configured for providing light to the light incidence surface of the second light guide component, the second light emitting component is disposed between two neighboring ends of the fourth light guide component and the first light guide component, and the second light emitting component is further configured for providing light to the light incidence surface of the first light guide component.

4. The optical touch device as claimed in claim 1, wherein each of the first light guide component and the second light guide component is a light reflecting bar, the first surface of the light reflecting bar is a light reflecting surface, the light source module further comprises a third light emitting component disposed between two neighboring ends of the first light guide component and the second light guide component for providing light to the detecting area, and the light reflecting bar is configured for reflecting the light arriving at the first surface thereof to the detecting area.

5. The optical touch device as claimed in claim 4, wherein the third light emitting component is a light emitting diode.

6. The optical touch device as claimed in claim 1, wherein the mirror light guide component is either a solid pillar or a hollow pillar.

7. The optical touch device as claimed in claim 6, wherein the mirror light guide component is a semi-cylindrical pillar, and the light emitting end of the mirror light guide component is a curve surface adjacent to the second surface.

8. The optical touch device as claimed in claim 1, wherein the mirror light guide component is hollow, and each of the light incidence end and the light emitting end of the mirror light guide component is either an opening or a transparent layer.

9. The optical touch device as claimed in claim 1, wherein the second surface of the mirror light guide component is either a curve surface or a flat surface.

10. The optical touch device as claimed in claim 1 further comprising a substrate, wherein the light guide module and the light source module are disposed on the substrate.

11. The optical touch device as claimed in claim 1, wherein the first light emitting component and the second light emitting component are respectively a light emitting diode.

12. A locating method for the optical touch device as claimed in claim 1, the locating method comprising:
- controlling the first light emitting component and the second light emitting component to emit light alternately, wherein the image detecting module detects a first optical information when the first light emitting component is lighted and the second light emitting component is closed, and the image detecting module detects a second optical information when the first light emitting component is closed and the second light emitting component is lighted; and
- determining a position of a touch point in the detecting area according to the first optical information and the second optical information detected by the image detecting module.

* * * * *